(12) United States Patent
Rogitz

(10) Patent No.: US 6,658,332 B2
(45) Date of Patent: Dec. 2, 2003

(54) ANTI-TERRORISM SHIPPING CONTROL

(76) Inventor: John L. Rogitz, 750 B. St. Suite 3120, San Diego, CA (US) 92101

( * ) Notice: Subject to any disclaimer, the term of this patent is extended or adjusted under 35 U.S.C. 154(b) by 0 days.

(21) Appl. No.: 09/973,377

(22) Filed: Oct. 9, 2001

(65) Prior Publication Data

US 2003/0069672 A1 Apr. 10, 2003

(51) Int. Cl.[7] .................................................. B60Q 1/00
(52) U.S. Cl. ..................... 701/21; 114/337; 114/342; 342/357.06; 342/357.16; 340/539; 340/573.6; 340/851; 340/984; 340/987
(58) Field of Search ........................... 701/21; 114/437, 114/342, 259; 342/357, 357.06, 357.07, 357.17; 340/539, 573.6, 984, 851, 985, 986, 987, 989

(56) References Cited

U.S. PATENT DOCUMENTS

| 5,386,368 | A | * | 1/1995 | Knight | 114/144 A |
|---|---|---|---|---|---|
| 5,491,636 | A | * | 2/1996 | Robertson et al. | 342/357 |
| 5,917,405 | A | * | 6/1999 | Joao | 340/426 |
| 5,933,110 | A | * | 8/1999 | Tang et al. | 342/357.11 |
| 6,273,771 | B1 | * | 8/2001 | Buckley et al. | 440/84 |
| 6,285,281 | B1 | * | 9/2001 | Gatto | 340/539 |
| 6,469,641 | B1 | * | 10/2002 | Lash et al. | 340/984 |
| 6,473,005 | B2 | * | 10/2002 | Showell | 340/984 |
| 2002/0121969 | A1 | * | 9/2002 | Jaoa | 340/425.5 |

* cited by examiner

Primary Examiner—Thomas G. Black
Assistant Examiner—Than C To
(74) Attorney, Agent, or Firm—John L. Rogitz

(57) ABSTRACT

An anti-terrorist ship control system includes satellites that automatically take control of a waterborne vessel when the vessel's position or speed deviate from planned tracks or when the vessel transmits a distress signal or when the vessel stops reporting its status to the satellites.

9 Claims, 1 Drawing Sheet

ANTI-TERRORISM SHIPPING CONTROL

FIELD OF THE INVENTION

The present invention relates generally to shipping control.

BACKGROUND

Terrorism is a fact of life, although not necessarily an immutable one. One target might be shipping, particularly large tankers or other large ships that carry dangerous or explosive cargo.

This invention can be used to foil infidels who attempt to hijack a ship and sail it into a target.

SUMMARY OF THE INVENTION

A manned vessel includes a waterborne hull and a control system supported on the hull and responsive to control signals from a control satellite to automatically control the speed and/or course of the vessel. If desired, a position reporting system can be mounted on the hull and can communicate a position of the vessel, a speed of the vessel, and a course of the vessel, to the satellite, for purposes to be shortly disclosed.

In a preferred implementation, a receiver is on the hull for receiving signals from the control satellite and communicating with the control system. The control signals can be generated when a reported position of the vessel deviates from a track position by at least a predetermined distance, or when a reported speed of the vessel deviates from a predetermined speed by at least a predetermined amount, or in response to an unplanned cessation of report signals from the position reporting system, or in response to a distress signal. Moreover, the control system can receive an override signal indicating overriding of remote control, and automatically activate a scuttling system in response to scuttle the vessel in the absence of an authorization signal to the contrary.

In another aspect, a method to foil ship hijackers includes permitting shipboard control of a ship until an indication of a hijacking of the ship is received. In response to the indication, at least one shipboard control system is disabled and/or overridden with signals from a satellite.

In yet another aspect, a shipping control system includes at least one space-based satellite, at least one waterborne vessel capable of receiving signals from the satellite, and at least one of: a propulsion system, a steering system, and a scuttling system on the vessel. The satellite is capable of receiving at least one indication of unauthorized control of the vessel and in response thereto automatically controlling at least one of the propulsion system, steering system, and scuttling system.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
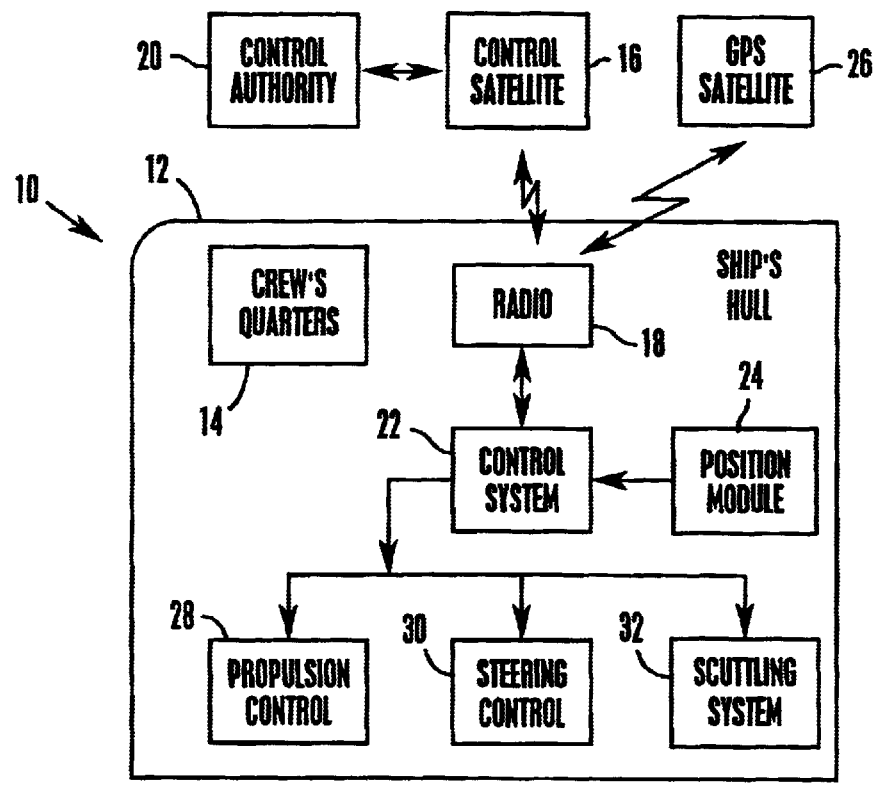
FIG. 1 is a block diagram of the present system.

Referring initially to FIG. 1, a manned waterborne vessel 10 includes a hull 12 with quarters 14 for a crew of people. In one non-limiting embodiment, the vessel 10 is an oil tanker. The vessel 10 can communicate with a space-based control satellite 16 using a radio transceiver 18. The control satellite 16 in turn communicates with control infrastructure including a land-based or space-based control authority 20, such as a national command authority. The control authority 20 and/or control satellite 16 preferably have access to a planned track, including planned courses and speeds, for the vessel 10.

The radio 18 communicates signals from the satellite 16 to at least one computerized control system 22 onboard the vessel 10. As shown, the control system 22 receives position and/or speed and/or course information from a position module 24, which can communicate with, e.g., a space-based GPS satellite 26 to receive position information therefrom. Also, the control system 22 can communicate control signals to at least one of a propulsion control system 28, a steering control system 30, and a scuttling control system 32 to respectively control the speed and course of the vessel 10 and to scuttle the vessel 10. While FIG. 1 shows separate modules/systems 22, 24, 28, 30, 32 for ease of disclosure, it is to be understood that their functions can be integrated into more, fewer, or indeed a single computerized component.

Figure 2:
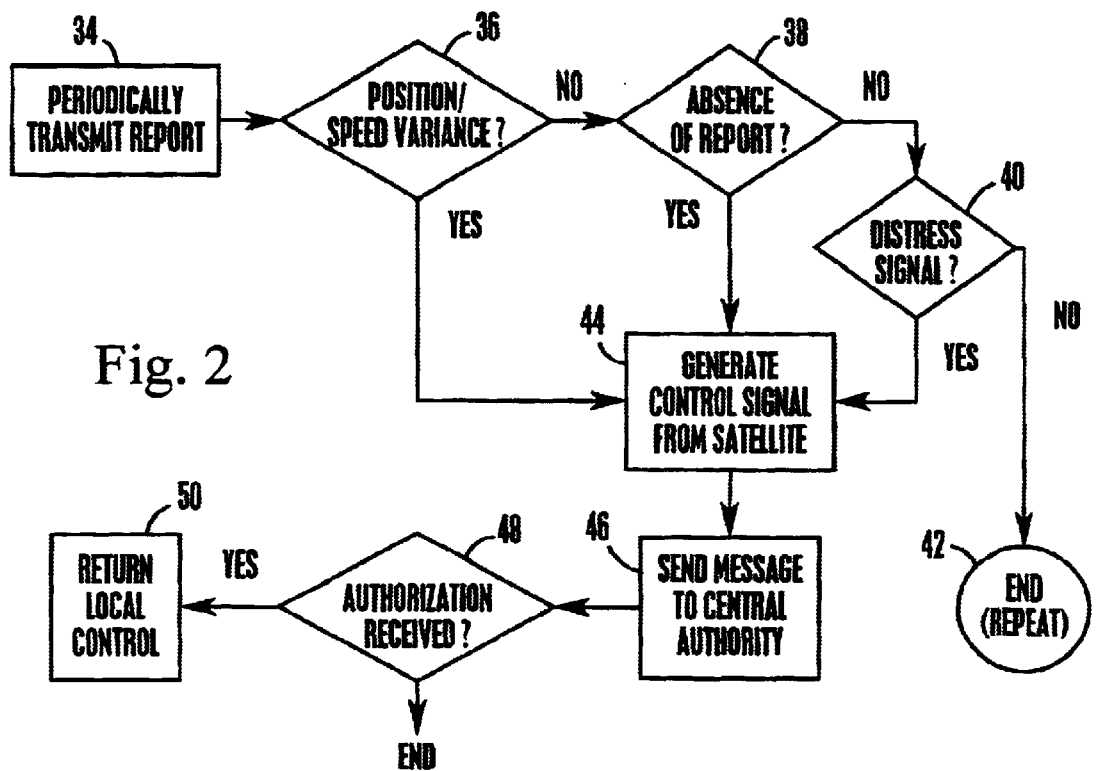
FIG. 2 is a flow chart of the present logic.

FIG. 2 shows the logic of the present invention. Commencing at block 34, the vessel 10 periodically transmits a report to the control satellite 16 (and, hence, to the control authority 20). The report can be a position report, a speed report, a course report, or all three, as received from, e.g., the position module 24, and it is preferably automatically (without human intervention) or manually (with human intervention) generated at specified intervals.

At decision diamond 36, it is determined by the control satellite 16 and/or control authority 20 whether a speed and/or position variance exists. That is, it is determined whether the vessel's course/speed varies from a planned course/speed by more than a predetermined amount, or whether the vessel's position varies from a planned track position by more than a predetermined amount. Also, even when the vessel's course, speed, and position are within planned bounds, the logic can move to decision diamond 38 to determine whether the vessel 10 has failed to report. This can happen when, e.g., terrorists commandeer the vessel 10. Yet again, the logic can move to decision diamond 40 to determine whether a distress signal has been sent from the vessel 10 by, e.g., a radio operator who is aware of a terrorist attack. If no indications of hijacking are received, the logic ends at state 42, i.e., the above-described vessel 10 monitoring simply repeats.

In contrast, when any one of the tests at decision diamonds 36, 38, 40 is positive, indicating a hijacking of the vessel 10, the logic moves to block 44, wherein a control signal is transmitted or otherwise generated from the control satellite 16. It is to be understood that the "control signal" can be generated at the control authority 20 and relayed via the control satellite 16, or initiated onboard the satellite 16 itself, and that it retains its identity as a "control signal" regardless of how processed through intermediate electronic or computer components.

In accordance with the present invention, the control signal can be configured to cause one or more actions to be automatically taken. Stated differently, the control signal disables and/or overrides local control of at least one shipboard control system, such as the propulsion control system 28, steering control system 30, or scuttling system 32. By way of example, the control signal can cause the propulsion system to come to "all stop" or even "back full". Or, it can cause the steering system to come to a new course or to lay the rudder over so that the vessel 10 circles in the water. Yet again, under certain circumstances such as an in extremis situation where the vessel 10 might be in a harbor as planned but heading at high speed for a populated pier, or when the terrorists have managed to override the control system 22 as indicated by continued indications of a hijacking or other override signal or indication, the scuttling system 32 might be actuated to sink the vessel.

In any case, in the event of a hijacking indication, the satellite 16 also sends a message to, e.g., the control authority 20 of this fact.

At decision diamond 48, it is determined whether an authorization to resume local control of the vessel 10 has been received. Such an authorization might be generated when, e.g., the terrorists have been overcome, or when a false indication of a hijacking has been given for some reason, e.g., by mistake. The authorization might be in any number of forms, and can be cryptographically protected. For instance, the captain of the vessel 10 and only the captain might be provided with a secret code that he can transmit to the satellite 16 to cause control of the vessel 10 to be returned to local onboard systems at block 50.

While the particular ANTI-TERRORISM SHIPPING CONTROL as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

What is claimed is:

1. A manned vessel, comprising:

at least one hull including quarters for a crew of people;

at least one control system supported on the hull and responsive to control signals from at least one control satellite to automatically control the speed and/or course of the vessel.

2. The vessel of claim 1, comprising at least one position reporting system mounted on the hull and communicating at least one of: a position of the vessel, a speed of the vessel, and a course of the vessel, to a satellite.

3. The vessel of claim 2, further comprising at least one receiver on the hull for receiving signals from the control satellite and communicating with the control system.

4. The vessel of claim 3, wherein the control signals are generated when a reported position of the vessel deviates from a track position by at least a predetermined distance.

5. The vessel of claim 3, wherein the control signals are generated when a reported speed of the vessel deviates from a predetermined speed by at least a predetermined amount.

6. The vessel of claim 3, wherein the control signals are generated in response to an unplanned cessation of report signals from the position reporting system.

7. The vessel of claim 1, wherein the vessel is an oil tanker.

8. The vessel of claim 1, wherein the control system can receive at least one override signal, and the control system automatically activates a scuttling system to scuttle the vessel in the presence of the override signal and absence of an override authorization signal.

9. The vessel of claim 3, wherein the control signals are generated in response to a distress signal from the vessel.

\* \* \* \* \*